(12) United States Patent
Ho et al.

(10) Patent No.: US 11,262,198 B2
(45) Date of Patent: Mar. 1, 2022

(54) PRESSURE ASSISTED POSITIONING METHOD AND DEVICE THEREOF

(71) Applicant: NATIONAL CHIAO TUNG UNIVERSITY, Hsinchu (TW)

(72) Inventors: Ping-Fan Ho, Hsinchu County (TW); Chia-Cheng Wang, Hsinchu (TW); Jyh-Cheng Chen, Taichung (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 162 days.

(21) Appl. No.: 16/665,416

(22) Filed: Oct. 28, 2019

(65) Prior Publication Data
US 2020/0132453 A1   Apr. 30, 2020

Related U.S. Application Data

(60) Provisional application No. 62/751,621, filed on Oct. 28, 2018.

(51) Int. Cl.
*G01C 5/06* (2006.01)
*G01C 21/28* (2006.01)

(52) U.S. Cl.
CPC .............. *G01C 5/06* (2013.01); *G01C 21/28* (2013.01)

(58) Field of Classification Search
CPC ........... G01C 5/06; G01C 21/28; G01C 21/30
See application file for complete search history.

(56) References Cited

FOREIGN PATENT DOCUMENTS

EP         2072949 B1 *  8/2018
WO    WO-2009104254 A1 *  8/2009

\* cited by examiner

*Primary Examiner* — Natalie Huls
*Assistant Examiner* — Michael J Singletary
(74) *Attorney, Agent, or Firm* — CKC & Partners Co., LLC

(57) ABSTRACT

Pressure assisted positioning method and device thereof are disclosed in the present invention. The pressure assisted positioning device is exerted for positioning a target under the circumstance of altitude change since the target enters a specific region. The pressure assisted positioning method includes the following steps. First, confirming the entrance of the specific region of the target and detecting a plurality of pressure data. Then, calculating a pressure variation between the two selected pressure data. At last, comparing the pressure variation to a threshold. An altitude change within the specific region is confirmed as the pressure variation is greater than the threshold. On the other hand, as the pressure variation is greater than the threshold, it refers to no altitude change within the specific region. Wherein, confirming the entrance of the specific region of the target determines via the result of detecting the target enters a region having at least a distance with a reference location of a structure with altitude change illustrated according to a map information. The pressure assisted positioning device of the present invention can not only directly detect the actual pressure data but calibrate the pressure variation information according to the pressure data and the moving statuses of the target as well. Comparing to the conventional device, the method and device of the present invention can calculate and calibrate the pressure variation information independently without any external pressure data from the barometric station.

18 Claims, 5 Drawing Sheets

PRESSURE ASSISTED POSITIONING METHOD AND DEVICE THEREOF

CROSS REFERENCE TO RELATED APPLICATIONS

This non-provisional application claims the benefit under 35 U.S.C. § 119(e) to U.S. Provisional Application No. 62/751,621, filed on Oct. 28, 2018, which is hereby expressly incorporated by reference into the present application.

BACKGROUND OF THE INVENTION

1. Field of the Invention

The present invention discloses a positioning method and a device thereof; in particular, the present invention discloses a pressure assisted positioning method and a device thereof.

2. Description of the Prior Art

With rapid development of electronics technologies, positioning devices such as cell-phones and navigation devices have been widely used in daily life.

Generally, most of the conventional positioning devices use the technology of global navigation satellite system and obtain positioning information through the coordination between satellites and positioning devices. However, the positioning accuracy of the conventional positioning devices is insufficient in an urban environment due to high signal blockage.

Hence, the improvement of the positioning accuracy of the positioning devices is essential in the positioning field.

SUMMARY OF THE INVENTION

The present invention provides a pressure assisted positioning method and a device thereof. After confirming the target entering the specific region, the location and the altitude change of the target are calculated via the pressure variation according to the plurality of pressure data detected within the specific region via the pressure detector.

The present invention provides a pressure assisted positioning method and a device thereof. The specific region is defined as the area of at least a distance from at least one reference location of a structure having an altitude change according to the map information. According to the definition of the specific region, the compensation for the failure of distinguishing the altitude change can be made.

The present invention provides a pressure assisted positioning method and a device thereof, wherein the pressure data detected may be the maximum atmospheric pressure value, the minimum atmospheric pressure value, a real-time atmospheric pressure value, an average atmospheric pressure value and a combination thereof.

The present invention provides a pressure assisted positioning method and a device thereof. When the pressure of the target detected via the pressure detector is affected due to the change of the environment pressure instead of the altitude, the false positive rate of pressure detecting can be reduced via the auto-calibration according to the ambient pressure or the pressure change at the next point-in-time. The pressure variation at the next point-in-time is estimated via the current pressure and the pressure variation rate.

The present invention provides a pressure assisted positioning method and a device thereof, wherein the altitude change of the target can be determined via auto-detecting and/or user-inputting, such as manual operation, voice control and so on.

The present invention provides a pressure assisted positioning method for assist positioning an altitude change of a target after detecting the target entering a specific region, wherein the pressure assisted positioning method comprises: firstly, confirming the target entering the specific region and detecting a plurality of pressure data within the specific region; secondly, calculating a pressure variation according to at least two of the pressure data; finally, comparing the pressure variation with a threshold. If the pressure variation is greater than the threshold, an altitude change of the target occurs within the specific region. If the pressure variation is not greater than the threshold, none of the altitude change of the target occurs within the specific area. Wherein confirming the target entering the specific region is determined via whether the target enters an area of at least a distance from at least a reference location of a structure having an altitude change according to a map information.

The present invention provides a pressure assisted positioning device for assist positioning an altitude change of a target after detecting the target entering a specific region. The pressure assisted positioning device comprising at least one processor and a pressure detector. The pressure detector is activated for detecting a plurality of pressure data within the specific region via the processor after confirming the target entering the specific region. The processor calculates a pressure variation according to at least two of the pressure data and compares the pressure variation with a threshold. If the pressure variation is greater than the threshold, the target has an altitude change within the specific area. If the pressure variation is not greater than the threshold, the target has none of the altitude change within the specific area. Wherein the specific area is defined as an area of at least a distance from at least a reference location of a structure having an altitude change according to a map information.

Accordingly, the presented pressure assisted positioning method and device thereof configured to position a target have overcome technical bottlenecks in previous technologies and improved positioning accuracy for altitude variation. Comparing to the conventional device, the method and device of the present invention can calculate and calibrate the pressure variation information independently without any external pressure data from the barometric station.

BRIEF DESCRIPTION OF THE APPENDED DRAWINGS

To clarify the purposes, features, advantages and embodiments of the present invention, the descriptions of the attached figures are as below:

DETAILED DESCRIPTION OF THE INVENTION

The connecting elements according to the present invention will be described in detail below through embodiments and with reference to the accompanying drawings. A person having ordinary skill in the art may understand the advantages and effects of the present disclosure through the contents disclosed in the present specification.

The terms "comprise", "include" or "have" used in the present specification are open-ended terms and mean to "include, but not limit to."

The term "and/or" in the present specification means any or all of the combinations of the items listed.

Unless otherwise particularly indicated, the terms, as used herein, generally have the meanings that would be commonly understood by those of ordinary skill in the art. Some terms used to describe the present disclosure are discussed below or elsewhere in this specification to provide additional guidance to those skilled in the art in connection with the description of the present disclosure.

First and foremost, the disclosed pressure assisted positioning method and device thereof are mainly based on the fact that, within a certain range of altitude (for example, within 3000 meters), variation of pressure is relative to variation of altitude. According to experimental results, atmospheric pressure decreases with the increase of altitude. With every 9 meters increase in altitude, the atmospheric pressure decreases 100 Pa. As such, the specification discloses different embodiments to illustrate applications of pressure assisted detection of altitude variation.

Figure 1:
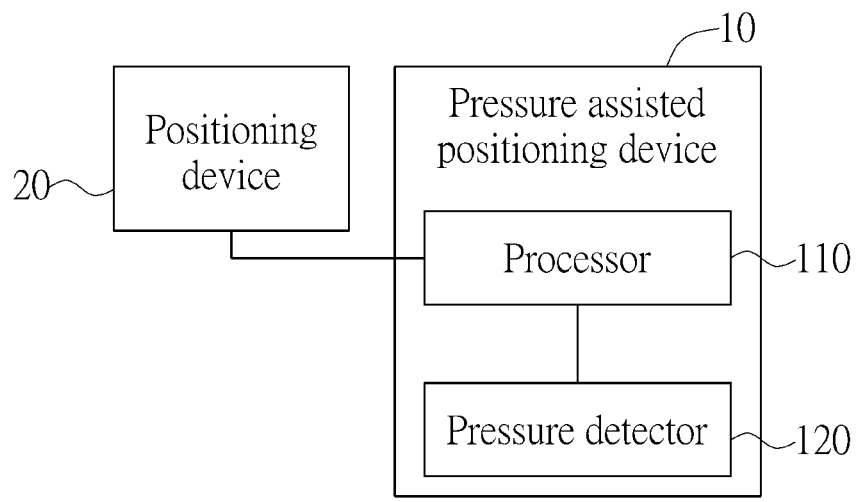
FIG. 1 is a block schematic of a pressure assisted positioning device according to an embodiment of the present invention.
Figure 2:
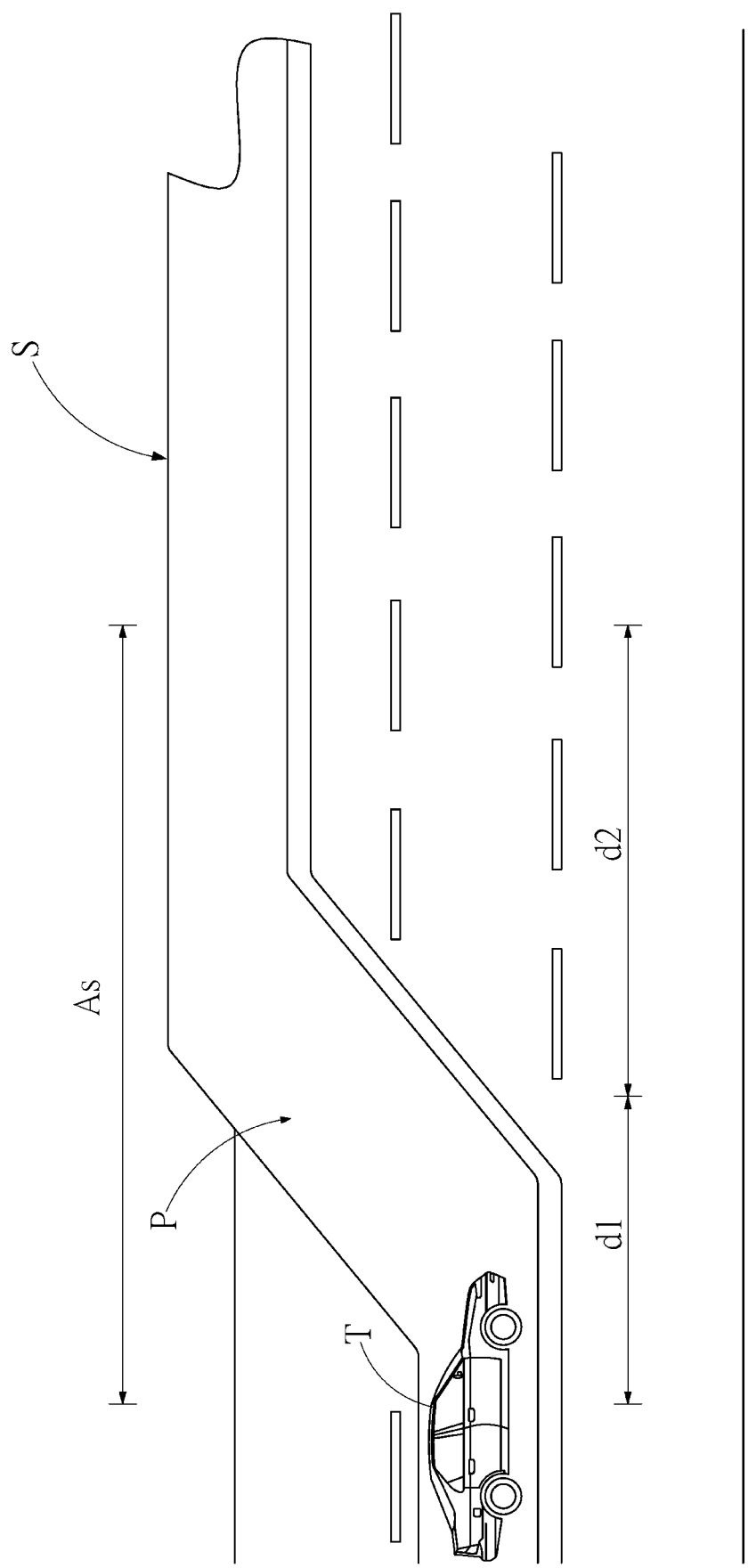
FIG. 2 is a scenario schematic of a pressure assisted positioning method according to an embodiment of the present invention.
Figure 3:
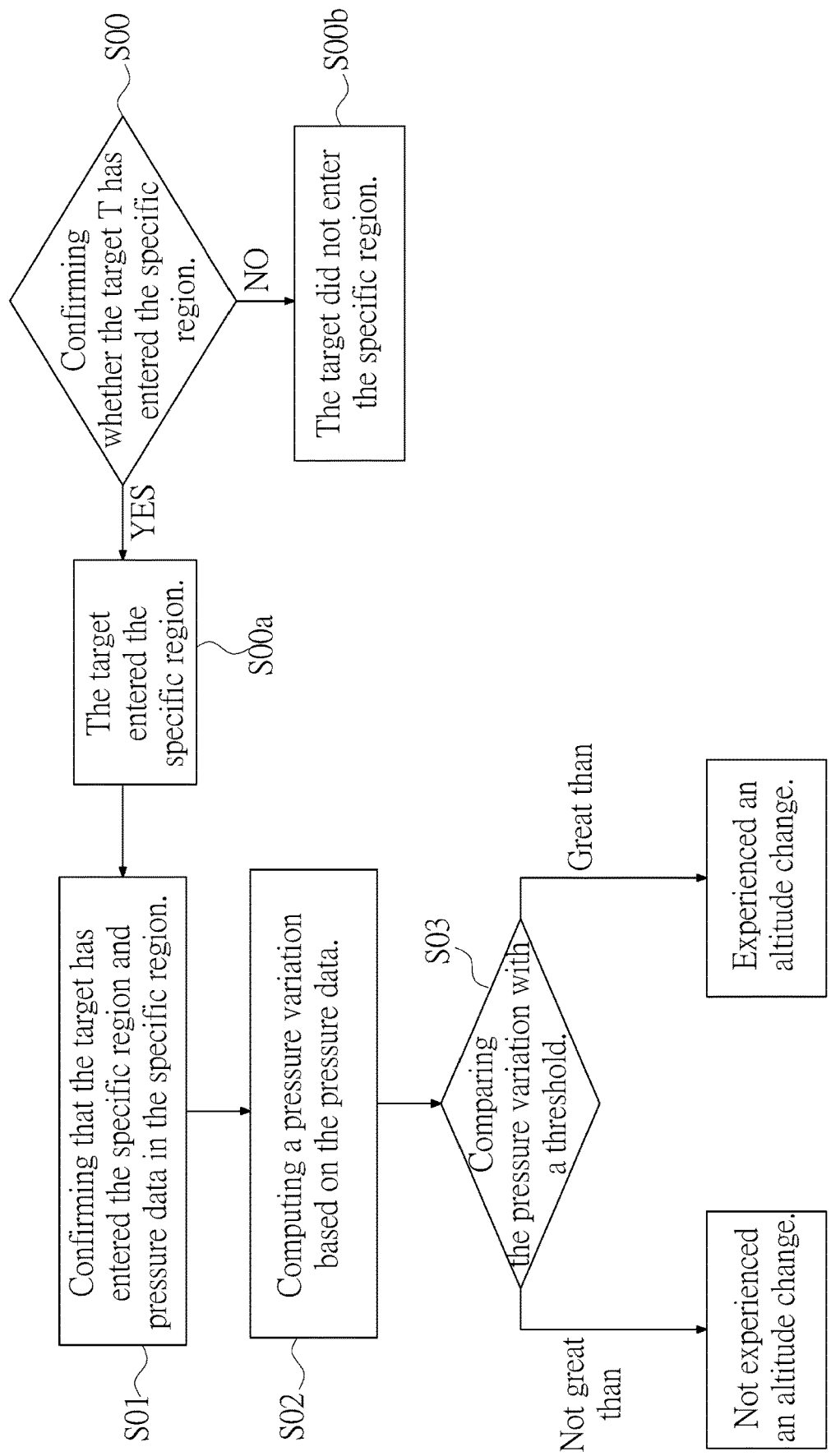
FIG. 3 is a flow chart of a pressure assisted positioning method according to an embodiment of the present invention.

Refer to FIGS. 1-3, wherein FIG. 1 is a block schematic of a pressure assisted positioning device according to an embodiment and FIG. 2 is a scenario schematic of a pressure assisted positioning method according to an embodiment. FIG. 3 is a flow chart of a pressure assisted positioning method according to an embodiment.

In the embodiment, the pressure assisted positioning device 10 assists a positioning device 20 to assist position a target T. After the positioning device 20 detecting the target T enters the specific region As, the pressure assisted positioning device 10 is activated. The pressure assisted positioning device 10 comprises at least one processor 110 and a pressure detector 120. Wherein after the processor 110 confirms that the target T has entered the specific region As, the pressure detector 120 is activated to detect a plurality of pressure data in the specific region As. Then, the processor 110 calculates a pressure variation according to at least two of the pressure data and compares the pressure variation with a threshold. Based on the comparison results from the processor 110, if the pressure variation is greater than a threshold, the target T is confirmed to have an altitude change within the specific region As. If the pressure variation is not greater than the threshold, the target T is confirmed not to have the altitude change within the specific region As. The specific region As mentioned above is defined as an area of at least a distance from at least a reference location P of a structure S having an altitude change according to a map information, wherein the reference location P is located inside the specific region As and the distances from the reference location P may be more than one. The distances may be consistent or various. Referring to FIG. 2, the embodiment is illustrated with various distances (distance d1 and distance d2) as an example. The specific region As with its ends being distance d1 and distance d2 from the reference location P may be measured by using location P as a starting point and extending distance d1 and distance d2 along the two directions of a bridge or a surface road. In another case, when the distance d1 equals to the distance d2, the specific region As is defined by taking the reference location P as the center of the circle and distance d1/d2 as the radius. In addition, the distance d1 and the distance d2 can be different. The distance d1 can be greater than the distance d2 or vice versa. However, generally speaking, based on design factors such as the altitude and the slope of the lane of the structure S, to include a complete ascent or descent lane in a specific region As, the distance d1 (or distance d2) are generally set to approximately 10 to 50 meters from the reference location P. However, depending on factors such as different structure S with altitude variance or the preciseness of the positioning device 2, the distances d1 and d2 can be adjusted within a reasonable range. Furthermore, as mentioned above, the structure S with altitude variance can be a bridge, and the reference location P is at an interchange of the bridge in the example. The structure S not only can be a bridge but also an underground lane, freeway, or multi-level road and the reference location P is at an interchange of the abovementioned structure S.

The pressure data detected by the pressure detector 120 is selected from the maximum atmospheric pressure value, the minimum atmospheric pressure value, the real-time atmospheric pressure value, the average atmospheric pressure value and a combination thereof in the specific region As. The definition of the specific region As is an area of at least a distance from at least a reference location P of a structure S having an altitude change, wherein at least a reference location P is located inside As and the distance (distance d1 and distance d2 in this embodiment) from the ends of the area. Additionally, the positioning device 20 can be an independent device as shown in FIG. 1 or a device integrated with the pressure assisted positioning device 10 (not shown in the Figures). Furthermore, the basis of determining a new specific region As of the positioning device 20 is mainly depended on whether an altitude change occurs or not. Hence, the positioning information produced corresponding to the specific region includes altitude change information.

In the aspect of hardware, the processor 110 can be but not limited to a central processor and/or a micro-processor and so on. The positioning device 20 can be a global positioning system (GPS) device or other positioning system such as a global navigation satellite system, Beidou satellite navigation system, Indian regional navigation satellite system (GNSS), Galileo, Quasi-Zenith satellite system or x-ray pulsar-based navigation. The positioning device 20 can also be but not limited to a wireless communication system such as 5G, Wi-Fi, Bluetooth, or optical communication; or it can be other sensing positioning technology such as image recognition, radar, laser, sensors fusion and AI. As for the positioning device 20 with integrated map information and altitude information, the positioning device 20 has a function to save multi-level map information. In other words, the positioning device 20 can save relative altitude information corresponding to a particular coordinate, wherein the coordinate can be but not limited to GPS, street, target, sea level or base station.

It should be understood that the pressure assisted positioning device 10 and the components thereof should not be limited by the disclosure of the embodiment. Whatever connections and applications used by the pressure assisted positioning device 10 to realize the technologies mentioned below can be applied to the present invention.

Accordingly, the corresponding flow chart is as below. The pressure assisted positioning method is activated when the target T enters the specific region As. The activation steps comprise: Step S01, confirming the target T entering the specific region As and detecting a plurality of pressure data within the specific region As; Step S02, calculating a pressure variation according to at least two of the pressure data; Step S03, comparing the pressure variation with a threshold. If the pressure variation is greater than the threshold, the target T is confirmed to have an altitude change in the specific region As. If the pressure variation is not greater than the threshold, the target T is confirmed to have not the altitude change in the specific region As.

Before executing the step S01, further confirm whether the target T has entered the specific region As of at least a distance (distance d1 and distance d2 in this embodiment) from at least a reference location P of a structure S having an altitude change according to a map information, as illustrated in step S00. If true, as shown in step S00a, the target T is confirmed to have entered the specific region As and continue to execute the step S01. If false, as shown in S00b, the target T is confirmed not to have entered the specific region As. Confirming whether the target T has entered the specific region As can be conducted using the auto-detection function of the positioning device 20 or by user-input.

In a practical application, to increase the accuracy of detecting the target T entering the specific region As, the specific region As is defined as a region within a structure S showing altitude variation based on map information, wherein a reference location P located inside As is distance d1 and distance d2 from the ends of the region. Because the map information includes various structure information having various altitude changes, the false positive rate of pressure detecting can be reduced. For example, the structure S with altitude change shown in FIG. 2 is a bridge and the corresponding reference location P is an on-ramp of the bridge. Hence, the specific region As includes the coverage having the on-ramp of the bridge as the reference location P and extended alone two directions with the distance d1 and the distance d2 from the reference location P. Similarly, an off-ramp of the bridge can be defined as another specific region As Hence, when the target passes through the bridge, the target can be clearly identified in that specific region As. However, to define the size of the specific region, besides the size, scale and complexity of the structure, the accuracy of other map information corresponding to the specific region must be taken as consideration as well. For example, the size used to define a specific region should not be greater than the accuracy of the GNSS corresponding to the specific region or the positioning procedure will become difficult or even impossible.

Hence, after the positioning device 20 detects that the target T has entered the specific region As, the processor 110 activates the pressure detector 120 to detect a plurality of pressure data in the specific region As. The processor 110 calculates a pressure variation according to at least two of the pressure data and compares the pressure variation with a threshold. In FIG. 2, when the pressure variation is greater than a threshold, the target T is confirmed to have an altitude change in the specific region As (the target T going on/off the bridge). When the pressure variation is not greater than the threshold, the target T is confirmed not to have an altitude change in the specific region As (the target T driving on the bridge or a surface road which comes after the bridge).

Accordingly, via the pressure assisted positioning method disclosed in the present invention, the altitude change of the target T (during driving) can be effectively determined, and even the different level of the altitude change can be distinguished.

In addition, confirming the target entering the specific region As in the step S01 can be implemented via auto-detecting or user-input. In addition, the step S01 of detecting a plurality of pressure data in the specific region As is achieved through detecting actual pressure or detecting external pressure via an external pressure detection device. The disclosed pressure assisted positioning method is activated as the target T is detected to have entered the specific region As. After the pressure assisted positioning method is activated, the pressure detection can be continuously working or can be optionally paused after confirming the target T being out of the specific region As and/or the altitude change of the target T has already occurred.

Figure 4:
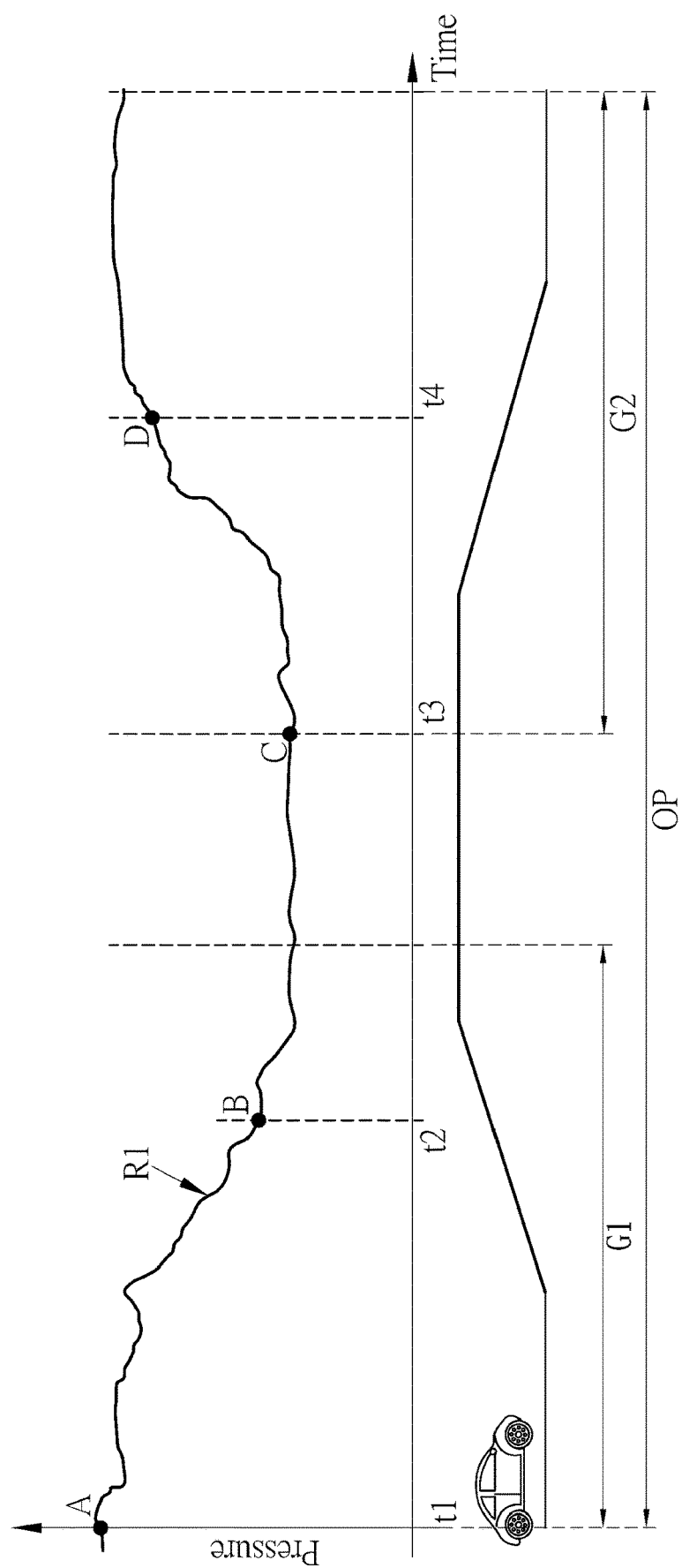
FIG. 4 is a scenario schematic of a pressure assisted positioning method according to an embodiment of the present invention.

FIG. 4 is a scenario schematic of a pressure assisted positioning method according to an embodiment. The following sections will be based on FIG. 1 and FIG. 4 to provide more specific details of the present invention. However, the present invention is not limited by the following embodiment.

In the embodiment, the pressure assisted positioning device 10 is arranged in a vehicle. Line R1 means the pressure value of the vehicle during the process of transportation from a surface road to an elevated road and then from the elevated road to the surface road as detected by the pressure assisted positioning device 10. In the embodiment, the pressure assisted positioning device 10 is configured to determine a current altitude of the vehicle with the pressure value represented in R1.

More specifically, the region G1 represents a default region where the vehicle is transported from the surface road to the elevated road. For example, the region G1 can be a region of 30-meter radius centered at the entrance to the elevated road. The region G2 represents a default region where the vehicle is transported from the elevated road to the surface road. For example, the region G2 can be a region of 30-meter radius centered at the exit of the elevated road. The region OP represents the entire region of the elevated road. In another embodiment, regions G1, G2, OP can be pre-set in the positioning device 20 or can be adjusted according to the measurement error(s) of the pressure assisted positioning device 10.

After confirming that the target T has entered one of the regions G1, G2 or OP, the processor 110, based on the positioning device 20's detection confirming the target T's entrance into the specific region As, activates the pressure detector 120 to detect a plurality of pressure data. In the embodiment, the pressure detector 120 continuously work to detect pressure date and update the maximum atmospheric pressure value and the minimum atmospheric pressure value while the target T is in the region G1. When the difference between the maximum atmospheric pressure value and the minimum atmospheric pressure value computed by the processor 110 is greater than a threshold, the processor 110 confirms that the target T has an altitude change in the specific region As. For example, when the time of the last update of the maximum atmospheric pressure value is earlier than the time of the last update of the minimum atmospheric pressure value, the pressure assisted positioning device 10 confirms that the target has an altitude change (ex. increase). Conversely, when the time of the last update of the minimum atmospheric pressure value is earlier than the time of the last update of the maximum atmospheric pressure value, the pressure assisted positioning device 10 confirms that the target has another altitude change (ex. decrease). Then, according to the aforementioned altitude changes and the map information, the pressure assisted positioning device 10 can determine the current altitude. For example, the pressure assisted positioning device 10 can determine that whether the target is entering or leaving an elevated road or an underground road. When the target enters the region G2, the pressure assisted positioning device 10 also performs similar operations mentioned above to determine whether the target is entering or leaving an elevated road or an underground road.

According to FIG. 4, when the target enters the region G1, as shown in line R1, at time point t1, the processor 110 uses the pressure detector 120 to derive a pressure value A (the maximum atmospheric pressure value). Between time point t1 and time point t2, the processor 110 continually updates the minimum atmospheric pressure value according to the pressure value detected by the pressure detector 120. At time point t2, the difference between the pressure value A and the pressure value B, as computed by the processor 110, is greater than a threshold, and the time of the last update of the maximum atmospheric pressure value is earlier than the time of the last update of the minimum atmospheric pressure value. Hence, the pressure assisted positioning device 10 confirms that the target has an altitude change (ex. increase). At the same time, the pressure assisted positioning device 10 further confirms, according to the map information from the positioning device 20, that the current position (e.g. G1) is located at the entrance of an elevated road, and confirms that the target is entering the elevate road and having an altitude change and rising to a higher level road. Subsequently, when the target enters the region G2, at time point t3, the processor 110 uses the pressure detector 120 to derive a pressure value C (the minimum atmospheric pressure value). Between time point t3 and time point t4, the processor 110 continually updates the maximum atmospheric pressure value according to the pressure value detected by the pressure detector 120. At time point t4, the difference between the pressure value C and the pressure value D, as computed by the processor 110, is greater than a threshold, and the time of the last update of the minimum atmospheric pressure value is earlier than the time of the last update of the maximum atmospheric pressure value. Hence, the pressure assisted positioning device 10 confirms that the target has another altitude change (ex. decrease). At the same time, the pressure assisted positioning device 10 further confirms, according to the map information from the positioning device 20, that the current position (e.g. G2) is located at the exit of an elevated road, and confirms that the target is leaving the elevate road and having an altitude change and descending to a lower level road.

In another embodiment, the processor 110 can process the pressure value detected by the pressure detector 120. For example, if the processor 110 receives 4 pressure values per second detected by the pressure detector 120, an average pressure per second can be computed as the final pressure value for computing. Or, the processor 110 can keep the pressure detector 120 activated and average the pressure values detected within a default time period (e.g. 5 sec.) before or after the target enters the regions G1, G2, or OP as the final pressure value for computing.

In addition, the pressure detector 120 can continue to be in an activated state, or can be activated by the processor 110 only when the target enters the region OP, the region G1 and/or region G2. The pressure assisted positioning device 10 confirms whether the target enters the specific region not only via auto-detection by the positioning device 20, but also via the information of altitude change information (such as height-level change information) inputted by the user to assist in the determination of altitude. For example, the pressure assisted positioning device 10 and/or positioning device 20 can provide a request for a user, such as through an audio output device, to notify whether the vehicle is located on an elevated road, underground road, or surface road. Besides, via providing a display device operated by touch screen, hand-writing, key-pressing, or any other means, provide a request for the user to input information of current location and/or altitude. Hence, the pressure assisted positioning device 10 and/or the positioning device 20 can, based on the user-input, receive the information of the altitude change to active the processor 110 integrated in the pressure assisted positioning device 10 and further activate the pressure detector 120. The pressure assisted positioning device 10 can, based on the positioning information (including height-level change information) and the aforementioned confirmation of altitude change, determine the current location and the corresponding altitude (e.g. whether the target is entering a surface road from an underground tunnel, or entering an elevated road from a surface road). Especially when the pressure assisted positioning device 10 is activated after the altitude change of the target has been occurred, the real-time altitude or change information inputted by the user, e.g. manual operation or through voice control, becomes more important. The reason is that the pressure assisted positioning device 10 under the aforementioned condition lacks the initial position information (including map information or level variation information and so on). Hence, the user-input is the most efficient and direct way to activate the processor 10 when the processor 10 has no calculation basis of initial condition. And therefore, no matter how the pressure assisted positioning device 10 is activated, whether through the activation mechanism of auto-detecting and/or user-inputting, the activation of the pressure assisted positioning device 10 can occur before the target enters the region OP or after the target enters the region OP.

In addition to the process mentioned above, under special circumstances, the pressure assisted detection method and device may need calibration or estimation. For example, before the processor compares the pressure variation with the threshold, at least two backgrounds corresponding to at least two pressure data are detected and used to calibrate the pressure data. Also, the backgrounds are also used as reference for adjusting the threshold value. In a practical application, when the target is detected entering the specific region via a positioning device, the pressure detector can detect a plurality of pressure data and the corresponding backgrounds simultaneously. The processor deducts the backgrounds from the corresponding pressure data and calculates the calibrated pressure variation. In addition to detecting backgrounds via the pressure detection device, the processor can also integrate with status detecting devices to detect related information such as the fan speed and window status of the target (vehicle) as a basis for calibration. Such information may further be used to adjust the threshold. For example, when the fan speed is higher, the threshold becomes higher, thereby preventing the false positive rate of pressure detecting via the pressure assisted positioning device because of the pressure variation caused by the fan. In an embodiment, threshold is adjusted according to the window status (closed or opened) of the vehicle. In a practical application, when the window of the vehicle is open, the threshold will increase correspondingly, thereby preventing the false positive rate of pressure detecting via the pressure assisted positioning device because of the pressure variation caused by the open window. The status detecting device can be but not limited to a fan speed detector, window status sensor and so on. The method for transmitting data from the status detecting device to the processor can be wired or wireless. In another embodiment, the processor can get the fan speed or the window status from the control system of the vehicle. In that case, the aforementioned fan speed detector and the window status sensor can be omitted.

In another case, the false positive rate of pressure detecting of the pressure assisted positioning device may be due to pressure variation caused by prolonged detecting, such as in the case of a traffic jam. In such case, in addition to the aforementioned calibration method, further estimation and calibration of the next pressure data can be done according to the pressure variation rate estimated from the detected pressure value. For example, when the vehicle pressure assisted positioning device is static (time point t1-t2), the pressure variation in the period is represented by DP and it is used to further calculate the pressure variation rate VR. Then, at the time point t3, the pressure data detected by the processor is represented by PC. Therefore, the calibrated pressure data PD is represented by the following formula:

$$PD=PC-DP-VR*(T3-T2)$$

Wherein the reason for deducting the pressure variation DP is that the pressure variation is caused by the environment instead of the different altitude of roads while the vehicle is in a static state. When the main reason of pressure variation is change in weather, pressure variation at the next time point can be estimated by the averaged pressure variation rate.

Figure 5:
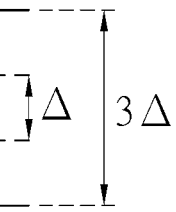
FIG. 5 is an airspace schematic of a pressure assisted positioning method according to an embodiment of the present invention.

Referring to FIG. 5, this embodiment applies the pressure assisted positioning device to the airspace of an unmanned aerial vehicle (UAV). For example, when the UAV with a pressure assisted positioning device flies in a specific airspace, the processor can derive pressure data in this period through a pressure detector. A pressure range in the specific airspace is defined by the processor as A. When the pressure variation is greater than a specific multiple of the pressure range A, for example, when the pressure variation is greater than 3 times the pressure range A, and the position of pressure assisted positioning device on a plane (e.g. according to the positioning device 20) is kept in a specific range (e.g. 500 m2), the pressure assisted positioning device is determined to have experienced altitude variation. In the embodiment, the pressure assisted positioning device rises to the altitude of Level 2 airspace from the altitude of Level 1 airspace or descends to the altitude of Level 0 airspace from the altitude of Level 1 airspace.

However, the positioning device of the present invention can be integrated with different detector corresponding to different detection method. In a practical application, the aforementioned detector can be selected from a velocity/acceleration detector, an angle detector, a coordinate detector, an acoustic detector, an optical detector, an image detector, a radio detector, a magnetic field detector and a combination thereof. For example, when the positioning device is integrated with an acceleration detector (e.g. accelerometer) and an angle detector (e.g. gyroscope), the positioning device can determine whether the vehicle has entered the specific region based on the current inclination angle of the vehicle going forward (e.g. the vehicle is climbing and the angle is 15 degree) and/or the inclination of the positioning device. Besides, when a radio wave device (e.g. a base station) provides a basis for positioning, in addition to confirming the location of the target by the radio wave device, the radio wave device (e.g. 4G, 5G or any base station) can further be used to download relative map information.

Although the present invention discloses the aforementioned embodiments, it is not intended to limit the invention. Any person who is skilled in the art in connection with the present invention can make any change or modification without departing from the spirit and scope of the present invention. Therefore, the scope of protection of the present invention should be determined by the claims in the application.

What is claimed is:

1. A pressure assisted positioning method, activated for assist positioning an altitude change of a vehicle after detecting the vehicle entering a specific region, the pressure assisted positioning method comprising:
   confirming the vehicle entering the specific region and detecting, by a pressure detector disposed on the vehicle, a plurality of pressure data in different positions of the vehicle within the specific region;
   calculating, by at least one processor, a pressure variation according to at least two of the pressure data; and
   comparing, by the at least one processor, the pressure variation with a threshold, wherein when the pressure variation is greater than the threshold, an altitude change of the vehicle occurs within the specific region, and when the pressure variation is not greater than the threshold, none of the altitude change of the vehicle occurs within the specific region,
   wherein confirming the vehicle entering the specific region is determined via whether the vehicle enters an area of at least a distance from at least a reference location of a structure having an altitude change according to a map information from a positioning device configured to detect the different positions of the vehicle.

2. The pressure assisted positioning method as claim 1, further comprising:
   pausing confirming the vehicle entering the specific region after confirming the vehicle being out of the specific region and/or the altitude change of the vehicle has already occurred.

3. The pressure assisted positioning method as claim 1, wherein confirming the vehicle entering the specific region is further determined via auto-detecting and/or user-inputting.

4. The pressure assisted positioning method as claim 1, wherein detecting the pressure data in the specific region is achieved through detecting, by the pressure detector, actual pressure or detecting external pressure via an external pressure detecting device.

5. The pressure assisted positioning method as claim 1, wherein detecting the pressure data in the specific region is achieved via detecting the pressure data selected from a maximum atmospheric pressure value, a minimum atmospheric pressure value, a real-time atmospheric pressure value, an average atmospheric pressure value and a combination thereof.

6. The pressure assisted positioning method as claim 1, wherein before calculating the pressure variation according to at least two of the pressure data, further calibrating, by the at least one processor, the pressure data via a plurality of backgrounds detecting corresponding to at least two of the pressure data.

7. The pressure assisted positioning method as claim 6, further comprising:

adjusting, by the at least one processor, the threshold according to the pressure data and/or the backgrounds.

8. The pressure assisted positioning method as claim 1, wherein before calculating the pressure variation according to at least two of the pressure data, further estimating, by the at least one processor, a pressure variation rate according to the pressure data for estimating and calibrating a next point-in-time pressure data.

9. The pressure assisted positioning method as claim 8, wherein when estimating the pressure variation rate according to the pressure data for estimating and calibrating the next point-in-time pressure data, the vehicle is further in a static state.

10. The pressure assisted positioning method as claim 1, wherein a number of the at least a distance is plurality, and the area of the specific region is defined by the various distances from the reference location.

11. A pressure assisted positioning device configured to determine an altitude change of a vehicle after detecting the vehicle entering a specific region, comprising:
at least one processor;
a pressure detector disposed on the vehicle and configured to detect a plurality of pressure data in different positions of the vehicle within the specific region, wherein the pressure detector is activated, via the processor, for detecting the pressure data within the specific region after confirming the vehicle entering the specific region, and the processor is configured to calculate a pressure variation according to at least two of the pressure data and compare the pressure variation with a threshold, when the pressure variation is greater than the threshold, the vehicle has an altitude change within the specific region, and when the pressure variation is not greater than the threshold, the vehicle has none of the altitude change within the specific region; and
a positioning device configured to detect the different positions of the vehicle,
wherein the specific region is defined as an area of at least a distance from at least a reference location of a structure having an altitude change according to a map information from the positioning device.

12. The pressure assisted positioning device as claim 11, wherein the reference location is a ramp of the structure having the altitude change.

13. The pressure assisted positioning device as claim 11, wherein as the distance is more than one, the distances are further consistent or various.

14. The pressure assisted positioning device as claim 11, wherein the pressure data is selected from a maximum atmospheric pressure value, a minimum atmospheric pressure value, a real-time atmospheric pressure value, an averaged atmospheric pressure value and a combination thereof.

15. The pressure assisted positioning device as claim 11, wherein an auto-detecting or an user-input is exerted to detect whether the vehicle enters the specific region.

16. The pressure assisted positioning device as claim 15, wherein the positioning device is selected from a velocity/acceleration detector, an angle detector, a coordinate detector, an acoustic detector, an optical detector, an image detector, a radio detector, a magnetic field detector and a combination thereof.

17. The pressure assisted positioning device as claim 11, further used with a status detector, providing at least one status information to the processor, the status detector detects a driving state, an air conditioning status, a door and window status and a combination thereof.

18. The pressure assisted positioning device as claim 11, wherein the processor is further configured to pause confirming the vehicle entering the specific region after confirming the vehicle being out of the specific region and/or the altitude change of the vehicle has already occurred.

* * * * *